United States Patent
Markram

(10) Patent No.: US 6,560,583 B1
(45) Date of Patent: May 6, 2003

(54) METHOD AND APPARATUS FOR CONSTRUCTING A SELF-ADAPTING SMART TRANSMISSION DEVICE TO CONTROL INFORMATION TRANSMISSION BETWEEN ELEMENTS OF A NETWORK

(75) Inventor: Henry Markram, Rehovot (IL)

(73) Assignee: Yeda Research and Development Co., Ltd., Rehovot (IL)

(*) Notice: Subject to any disclaimer, the term of this patent is extended or adjusted under 35 U.S.C. 154(b) by 0 days.

(21) Appl. No.: 09/372,173

(22) Filed: Aug. 11, 1999

Related U.S. Application Data

(63) Continuation-in-part of application No. 09/132,668, filed on Aug. 12, 1998.

(51) Int. Cl.[7] .................................................. G06N 3/02
(52) U.S. Cl. ............................ 706/16; 706/20; 706/26; 706/35
(58) Field of Search ............................ 706/16, 20, 26, 706/35; 382/260; 73/643; 702/60; 704/219

(56) References Cited

U.S. PATENT DOCUMENTS

| | | | | | |
|---|---|---|---|---|---|
| 4,893,255 | A | * | 1/1990 | Tomlinson, Jr. | 706/35 |
| 5,625,751 | A | * | 4/1997 | Brandwajn et al. | 706/20 |
| 5,933,355 | A | * | 8/1999 | Deb | 702/60 |
| 6,167,373 | A | * | 12/2000 | Morii | 704/219 |
| 6,382,029 | B1 | * | 5/2002 | Shoureshi et al. | 73/643 |
| 2002/0181799 | A1 | * | 12/2002 | Matsugu et al. | 382/260 |

OTHER PUBLICATIONS

Saha, M.M.; Izykowski, J.; Lukowicz, M.; Rosolowskiz, E., Application of ANN methods for instrument transformer correction in transmission line protection, Developments in Power System Protection, 2001, Seventh International Conference on, (IEE), 9–12 Ap.*

Sun, Y.; Jiang, H.; Wang, D., Fault synthetic recognition for an EHV transmission line using a group of neural networks with a time–space property, Generation, Transmission and Distribution, IEE Proceedings–, vol.: 145 Issue: 3, May 1998, pp.: 265–2.*

Zakrzewski, R.R.; Kolodziej, W.J.; Mohler, R.R., Application of hierarchical neural–network–based control to transient stabilization of interconnected power systems, Decision and Control, 1994., Proceedings of the 33rd IEEE Conference on, vol.: 2, 1994.*

Henry Markram et al Potential for Multiple Mechanisms, Phenomena and Algorithms for Synaptic Plasticity at Single Synapses Neuropharmacology 37 (1998).

* cited by examiner

Primary Examiner—Wilbert L. Starks, Jr.
(74) Attorney, Agent, or Firm—Martin Fleit; Paul D. Bianco; Fleit Kain Gibbons Gutman & Bongini PL

(57) ABSTRACT

A process and apparatus that enable continual self-adaptation of dynamic transmission devices (saSTDs), allow "smart" filtering of information for transmission from one element to another within a network of interacting elements, such as a "neural network". An adaptation algorithm (MapSA) incorporated in STDs allows multiple parameters of STDs (which determine its filtering properties) to continuously adapt simultaneously and interdependently. In this manner, complex correlations can be established between the parameters in all STDs within a network of interacting elements. The process according to the invention therefore establishes unique patterns of connection parameters within the network which in turn dictates a novel sequence of information processing steps by the network.

34 Claims, 4 Drawing Sheets

A SELF-ADAPTING SMART TRANSMISSION DEVICE

METHOD AND APPARATUS FOR CONSTRUCTING A SELF-ADAPTING SMART TRANSMISSION DEVICE TO CONTROL INFORMATION TRANSMISSION BETWEEN ELEMENTS OF A NETWORK

CROSS-REFERENCE TO RELATED APPLICATIONS

This application is a continuation-in-part of U.S. application Ser. No. 09/132,668, filed on Aug. 12, 1998.

FIELD OF THE INVENTION

The invention relates to a method and apparatus pertaining to dynamic transmission lines which allows multiple parameters, that control smart operations of dynamic transmission lines, to self-adapt simultaneously according to novel filter functions of the input to the transmission line and the unfiltered response of the target element. This formula or apparatus allows an unlimited number of smart transmission lines to be incorporated into networks of interacting elements.

BACKGROUND AND SUMMARY OF THE INVENTION

Networks of interacting elements must be connected by transmission lines. Normally a great deal of effort is made to ensure faithful transmission from one element to the next, and many learning algorithms relate to strengthening or weakening the transmitted signals as a means of controlling the interaction between the elements. However, transmission lines may not always be inert in their transmission; that is, they may actually interact with the transmitted information, thereby modifying their transmission capability and hence the information transmitted. In the brain, for example, neurons are thought to communicate via such complex "smart connections".

Such an active role of the transmission line could vastly amplify the information processing capability of a network of interacting elements since the transmission line carries out a "smart operation" by selecting to transmit only a subset of information. However, if a network contains millions or billions of such "smart connections" (hereinafter called smart transmission devices or STDs), it is essentially impossible to set the properties of each STD so that all the "smart operations" carried out by the STDs in the network are compatible with each other. The present invention solves this apparent impossibility of orchestrating smart operations of a vast number of STDs.

The invention is directed to a process and apparatus for converting STDs into multiparameter self-adapting transmission lines (hereinafter called saSTD's). STDs allow smart filtering of information transmitted from one element to another within a network of interacting elements, such as a "neural network" and a multiple parameter supra-algorithm (hereinafter called MapSA) allows for control of the smart operation. MapSA serves to align the functions of even billions of STDs, allowing each one to transmit information compatible to the other. Such orchestration of a vast number of smart operations in a network could form the basis of a new generation of robots, computers, software programs, electronic circuits and network communication lines.

In order for information (represented by a series of binary electrical pulses) to be transmitted along a communication line from one brain cell to the next, the information must pass through a transfer station called a "synapse". Synapses are essentially electrochemical transducers that convert a binary electrical signal (a pulse of set amplitude) into an analog chemical signal which, in turn, produces an analog electrical signal (a pulse of variable amplitude) in the target cell. About 50 years ago, it was suggested that these synapses can change their transmission strength and that such changes may form the basis of memory storage in neural networks (See D. Hebb, "The Organization of Behavior," J. Wiley & Sons, New York, 1949). In other words, Hebb originally declared that the strength of transmission lines (also referred to as the "weight" or "gain" of synaptic transmission) is a plastic parameter. Many different algorithms have been formulated in the past to alter the value of the synaptic gain which are published and form the basis of patents (see for example, Alkon et al., U.S. Pat. No. 5,402, 522).

Recently is was declared that the non-linear transfer of information between neurons can also change (H. Markram & M. Tsodyks, 1996; Nature, 382, 807–810). The non-linear transmission of information across synapses is due to a delicate sequence of utilizing the gain of the synapse (gain is equivalent to all available "resources" of the synapse). For example, a synapse may begin using only a small fraction of its resources and then facilitate progressively increasing use of resources as each pulse of information arrives at the synapse. In addition, every time the resources are spent by the synapse, it takes time to replenish them, which leads to depression of transmission at a time when the information traffic is high.

The interplay between utilization, facilitation and depression results in rapid changes in transmission capacity from one moment to the next. The result is that the information that arrives in the synapse is not faithfully transmitted, but actually filtered in a complex non-linear manner; hence the term "smart operation". Utilization, facilitation and depression are then three crucial parameters of STDs which determine their smart operation. These parameters are also referred to as "kinetic parameters". NOTE: non-linear transmission does not refer to non-linear summation and complex transfer functions that determine how a single cell adds up the multiple analog information; rather, the invention relates to non-linearities in the communication lines (STDs) not in the elements of a network, which are usually seen as the processing elements (PEs).

The major difficulty in connecting PEs in a network via STDs is how to set the values of kinetic parameters that together determine the smart operation of a vast number of STDs. Using the MapSA, the STD is controlled with a device that first assesses the importance of the contribution of each kinetic parameter before determining how the parameter setting should change. The MapSA is different from any prior art in that functions are provided to evaluate the role of the parameters themselves in the transmission as compared to each other (i.e. in a relative manner) and, based on the results of the evaluation, the settings of the parameters are changed. In prior systems, the contribution of the entire synaptic output to the response of the target neuron formed the basis of adjusting the gain of the transmission.

The inventor's studies of the functional significance of such dynamics indicate that MapSA could align any number of smart operations carried out by STDs across a network; a hitherto unimaginable and unsolvable task since the transmission of as many as $10^{14}$ STDs may need to be aligned. In other words, the information transmitted by each STD in the entire meshwork would become compatible and complementary with that transmitted by every other STD, allowing transmission of a multitude of small fragments of related information and spontaneous coagulation into a coherent and complete representation of an image, sound, smell etc., and therefore represent the most efficient form of information processing possible in networks.

An object of the invention is to provide a process and apparatus to construct saSTDs which can then be incorporated into networks of interacting elements. Since MapSA solves the problem of using STDs in networks this invention allows for a new generation of networks with virtually limitless capacity for change.

Other objects, advantages and novel features of the present invention will become apparent from the following detailed description of the invention when considered in conjunction with the accompanying drawings.

DETAILED DESCRIPTION OF THE DRAWINGS

Figure 1:
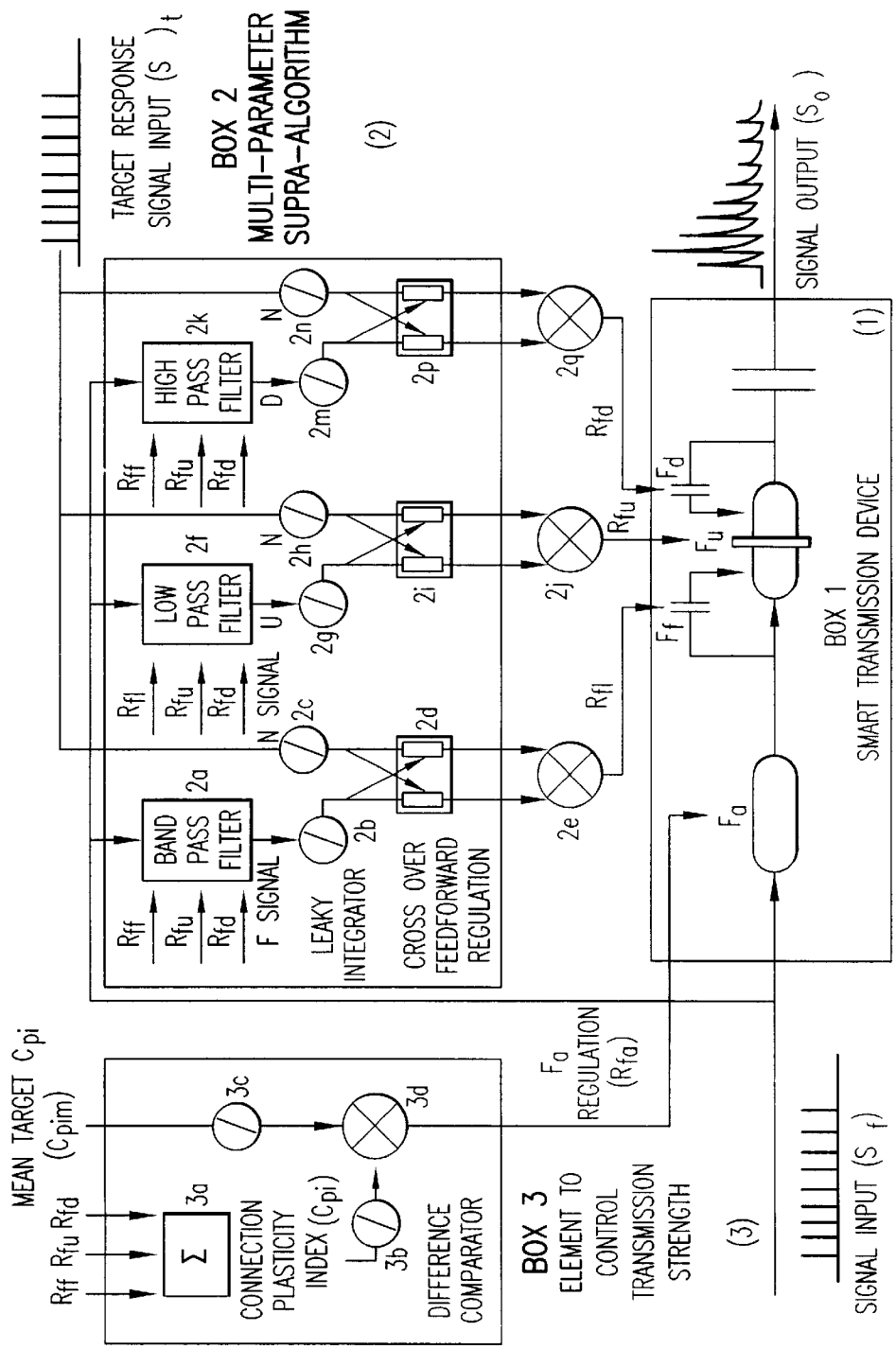
FIG. 1 is a schematic diagram of an arrangement for controlling the process parameters in a single connection or node of an information processing network according to the invention.

As shown in FIG. 1, the transmission capacity of a connection of the type described above changes dynamically as the connection is used (block 1; circuit to generate smart transmission devices, STDs), with three minimal transmission parameters (referred to as "kinetic" parameters) determining the character of the dynamic response (a facilitating factor, Ff; a use factor, Fu and; a depression factor, Fd) and one parameter setting the absolute strength of the connection (absolute strength factor, Fa). The connection is like a "smart filter" where the net transmission $S_o$ varies in a complex non-linear manner for any given series of binary inputs ($S_i$). The particular form of the non-linear operation depends on the values of the three kinetic parameters (Ff, Fu & Fd).

In FIG. 1, binary signals arrive at the connection (shown as Signal input, Si). The Fa parameter, which determines the maximal possible amplitude of these binary signals, could be analogized to a resistor in an electronic circuit: the lower the resistance the more current will flow, allowing the binary pulses to be larger. Thereafter, the pulses are fed into another element Fu which determines how large the binary pulses will be by determining what fraction of the Fa-determined current should pass through. The Fu element is analogous to a second resistor in series with the Fa element. The value of the Fu parameter determines how easily the pulses can flow across the element. In the electronic circuit analogy—a position in a rheostat.

In parallel, the pulses scaled by the Fa element are also fed into another element, Ff that acts to feed forward and amplify the transmission of the pulses across the Fu element (moves the Fu position of the rheostat). Each pulsed input into the Ff element results in a jump in the value of the Fu position such that the Fu element allows pulses of large amplitude to emerge (towards the maximum value set by Fa). This element could also have an amplifier or an attenuator element within it in order to regulate the amplitude of these pulses. Each pulse within this Ff element also decays much slower than the binary on-off pules, thus allowing the facilitative effect of the pulses to accumulate, and hence an accumulating facilitation of the transmission across the Fu element. The slow decay of the effect of the Ff element on the binary pulses could be considered similar to the effect of passing the pulses through a capacitor before reaching the Fu element. The value of the Ff parameter, which sets how long the decay will be, determines how long the effect of each binary pulse will last. Practically, the output from the Ff element changes the Fu position in a manner that is analogous to changing the position of a Rheostat and can actually drive it to a maximum during a high frequency input of binary pulses.

The electrical pulse emerging from the Fu element are pulses of variable amplitude. These pulses now feedback into an Fd element which serves to drive the Fu position in the opposite direction as that of the Ff element, causing depression of the transmission of the Fu element (e.g. increased resistance). Similar to the Ff element, an amplifier or attenuator may also serve to tune the amplitude of the pulses within the Fd element. As in the case of the Ff element, the pulses pass through a capacitor-like element, allowing a slowly decaying effect of each pulse. The rate of decay is set by the value of Fd. Practically speaking, the two opposing actions of Ff and Fd cause a variable output of pulses to emerge from the Fu element. The net transmission therefore depends on the value of Fa, the resting value of Fu and the values of Ff and Fd during a series of input pulses ($S_i$). As the effects of Ff and Fd decay, the Fu parameter approaches its resting (steady sate) value. Note that the original binary input pulses are now analog in terms of amplitude, since the amplitudes will be determined by the momentary transmission capacity of the Fu element. The output is, however, still pulses.

The output pulses so generated are now transmitted through a capacitor to allow the effect of each pulse to decay slowly and hence to produce the pulsed change and slow decay shown in the signal output ($S_o$). The effect of each pulse on the target therefore lasts longer than each pulse, allowing accumulation in time and in space with inputs from other connections of other cells.

In the network process and arrangement according to the invention, the three kinetic parameters Ff, Fu and Fd are regulated as indicated in Block 2 (circuit for the multiparameter supra-algorithm), which is discussed below.

Changing Ff

The output signals $S_o$ are summed in a single cell to produce a target response. This target response provides a signal input (St) into the MapSA circuit. As shown in Block 2 of FIG. 1, the binary amplitude input signal St from the target neuron is fed into a bell-shaped or band pass-like filter 2a to produce a sequence of pulses of different amplitudes according to the properties of the signal. A band pass filter is the most appropriate, since the value of Ff changes in a bell-shaped manner as a function of the Si frequency. That is, the influence of the Ff parameter on the overall transmission process first rises and then falls as a function of frequency. Logically, this Ff parameter should be changed according to the influence of the Ff parameter on the filtering properties of the non-linear transmission circuit in box 1. In other words, when the input signals arrive at low rates (having a period greater than the time constant of the Ff element), then as each new pulse arrives, the effect of Ff on the Fu element has already decayed; therefore no accumulated effect can occur. Thus at low frequencies the Ff parameter is less important and hence should not be changed.

At the other extreme, when the input signals arrive in rapid succession, then Ff accumulates causing maximal transmission by the Fu element. This leads to an opposing maximal rise in the Fd value with the net result of reduced transmission, $S_o$. Thus under high frequency conditions, changing Ff does not further change transmission. However, in the mid-frequency range, Ff plays a crucial role. A band-pass-like filter 2a is therefore chosen to determine a factor which would reflect how important the Ff parameter will be for that signal.

The output of this filter is integrated with a leaky integrator 2b to produce a continually changing analog like signal—i.e., the effect of each pulse is allowed to accumulate and decay slowly. This "Ff appropriate" signal is termed the F signal.

The binary amplitude signal St from the target neuron, which represents the on-going activity status of the target cell, is also fed in and integrated by a leaky integrator 2c (termed the N signal), and the result is then compared with the F signal. The logic here is simply that if the F signal is contributing to the activity status of the target cell, then the Ff parameter will be increased. If, however, the F signal is high when it is not useful (that is, it has little influence) to the target cell then the Ff parameter is decreased, because it is deemed wasteful. Practically, this effect can be achieved by a cross-over positive feed forward mechanism 2d where the transmission of any N signal increases with the amplitude of the F signal, and similarly the transmission of any F signal increases with the amplitude of the N signal.

The output of the F and N signals are fed into a comparator 2e, the output of which determines the amplitude of a regulatory signal for the Ff parameter (Rff). The comparison is such that when the N signal is high, the Rff causes the Ff parameter to increase, and when the F signal is high this causes the Ff parameter to decrease.

Operationally, this design (with cross-over feed forward regulation) allows a high preceding F signal (representing high Ff appropriateness) to increase transmission of any subsequent N signal (the target cell's response). Similarly, a rise in the N signal increases transmission of the F signal, such increase representing input that arrived after the target cell has already been activated. This design thus constitutes a mechanism for judging how well the F signal is contributing to the activity of the target cell, or how inappropriate the F signal is. Note that in this scheme, since the F signal enables transmission of the N signal and vice versa, either signal is transmitted only if the other is high. Accordingly, when either the N signal or the F signal is high on its own, then no change takes place since the resting transmission of these signals is zero (i.e., infinitely high resistance). This creates an interaction window during which the Ff component of inputs signals are judged. The sharpness of this window can be set by the leakiness of the integrations 2b and 2c. The interaction window can also be made asymmetrical by differentially setting the leakiness of the integrators of the F and N signals.

Changing Fu

The Fu parameter determines the steady state position (value) of the "rheostat" of the Fu element. The higher the Fu position, the larger the initial response of the non-linear transmission circuit (which approaches the maximum amplitude set by the Fa element; i.e., in terms of resistance, the Fu element would be set at near zero). When Fu is high, however, Fd is also near maximum (since the transmission is maximal), and hence transmission is reduced by virtue of high feedback depression (Fd). However, as is the case with the Ff element, at low frequencies the setting of Fu is hardly affected by Fd, since, as each successive pulse arrives, the effect of the Fd element has decayed to a minimum. As the frequency rises, the Fd parameter becomes dominating, and changing Fu has much less of an effect. Thus, the input signal St from the target cell is passed through a low pass-like filter 2f to determine the "Fu appropriateness" of the input signal (termed the U signal). The U signal is compared to the activity status of the target cell (the N signal) with the same type of mechanism as described for the F signal, comprising leaky integrators 2g and 2h, cross-over feed forward mechanism 2i and comparator 2j.

Changing Fd

As just noted, at low input ($S_i$) frequencies the Fd parameter is not very important, since the effect of Fd on the Fu element has decayed by the time the next input pulse arrives. The Fd parameter, however, becomes progressively more important as the input signals increase in frequency. For this reason, the input signals are passed through a high pass-like filter 2k to determine the D signal, and processed thereafter in the same manner as the U and N signals, by elements 2m, 2n, 2p and 2q.

The properties of the band, low and high pass-like filters 2a, 2f and 2k are not set arbitrarily. Rather, they are also constantly adjusted in the manner described hereinafter, by the regulatory signals produced (Rff, Rfu and Rfd). Each filter's properties can be set as a function of all three regulatory signals. That is, the exact properties (termed P1, P2 . . . Pn; not shown) of each filter (Band pass; 2a, low pass, 2f and high pass, 2K) that is used in block 2 can be set, for example, as any function of the Rff, Rfu and Rfd signals. For example, if property P1 of the band pass filter 2a determines the amplitude of the optimal frequency of transmission then P1 can be set as follows:

$$P1 = Ka^*Rff + Kb^*Rfu + Kc^*Rfd,$$

where Ka, Kb and Kc are proportionality constants. Each of the properties P1 . . . Pn of each filter can be set by such a function.

This innovation allows the adaptation process itself to adapt as the connection adapts, which will allow the changes in the values of the parameters to stabilize as a function of the activity in the network. The logic here is that the status of the connection not only determines the transmission properties, but also the rules which they should be changed further. Thus, the status of the connection determines the transmission function, which in turn determines how the transmission function will change.

For completeness, we also adjust Fa using a novel "plasticity index". The logic in changing the strength of transmission is different from that which is used for changing the kinetic parameters. The kinetic parameters determine the dynamic transform function of the connection, whereas the strength simply sets the volume or gain of transmission. Since this parameter is therefore not involved in determining the precise moment to moment changes, the latter are not deemed to be directly important in changing its value. Instead, this parameter must be changed according to the volume of appropriate activity of the connection. The target cell may receive input from thousands of connections, thus the volume could be compared with the mean volume of activity for all its connections.

To assess the appropriateness of the volume of activity of any one connection one can use the integer sum of the regulatory factors produced (which actually represent how much the connections are changing), since this already represents the three important types of appropriate activity. This integer sum generated by the summation unit 3a is termed the Connection Plasticity Index (Cpi) and the mean Cpi for all the connections onto one cell is termed the Cpim.

Figure 2:
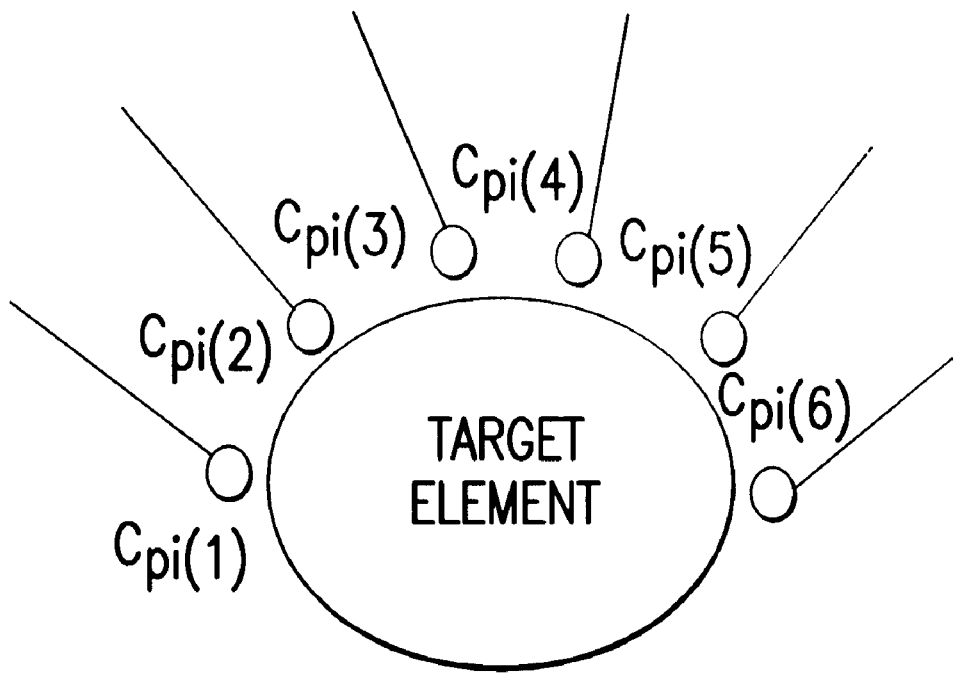
FIG. 2 illustrates schematically the generation of a mean connection plasticity index, Cpim in FIG. 1.

Cpim is the integrated sum of Cpi for each connection on a target element divided by the number of connections impinging on the target element, as shown in FIG. 2. In the initial stage of learning the number of connections on a target element is prescribed. In an alternative embodiment (not shown), the connections are eliminated if the connection strength (Fa in Box 1) drops below a certain value. In this case the connection parameter will be updated.

The Cpi and Cpim signals are fed into leaky integrators 3b, 3c to generate a definable interaction window. The results are fed into a comparator 3d where the Cpi is compared with Cpim to generate the regulatory factor Rfa. The amplitude of the Rfa signal is determined by the difference between Cpim and Cpi and by the absolute value of Cpim. In other words: Rfa=(Cpi−Cpim)*Ka*Cpim!, where Cpim! is the integer value of Cpim.

Note that the larger the difference is, and the higher Cpim is, the greater the Rfa signal is. Also, in this same formula, the sign (positive or negative) is produced. In other words, if Cpim is greater than Cpi then the Rfa is negative, and will reduce the setting in Block 1. Thus, practically the Rfa signal will set the transmission capacity of the Fa element. In terms of an electronic circuit this is equivalent to changing the position on the rheostat (Fa position on the Fa element).

Figure 3:
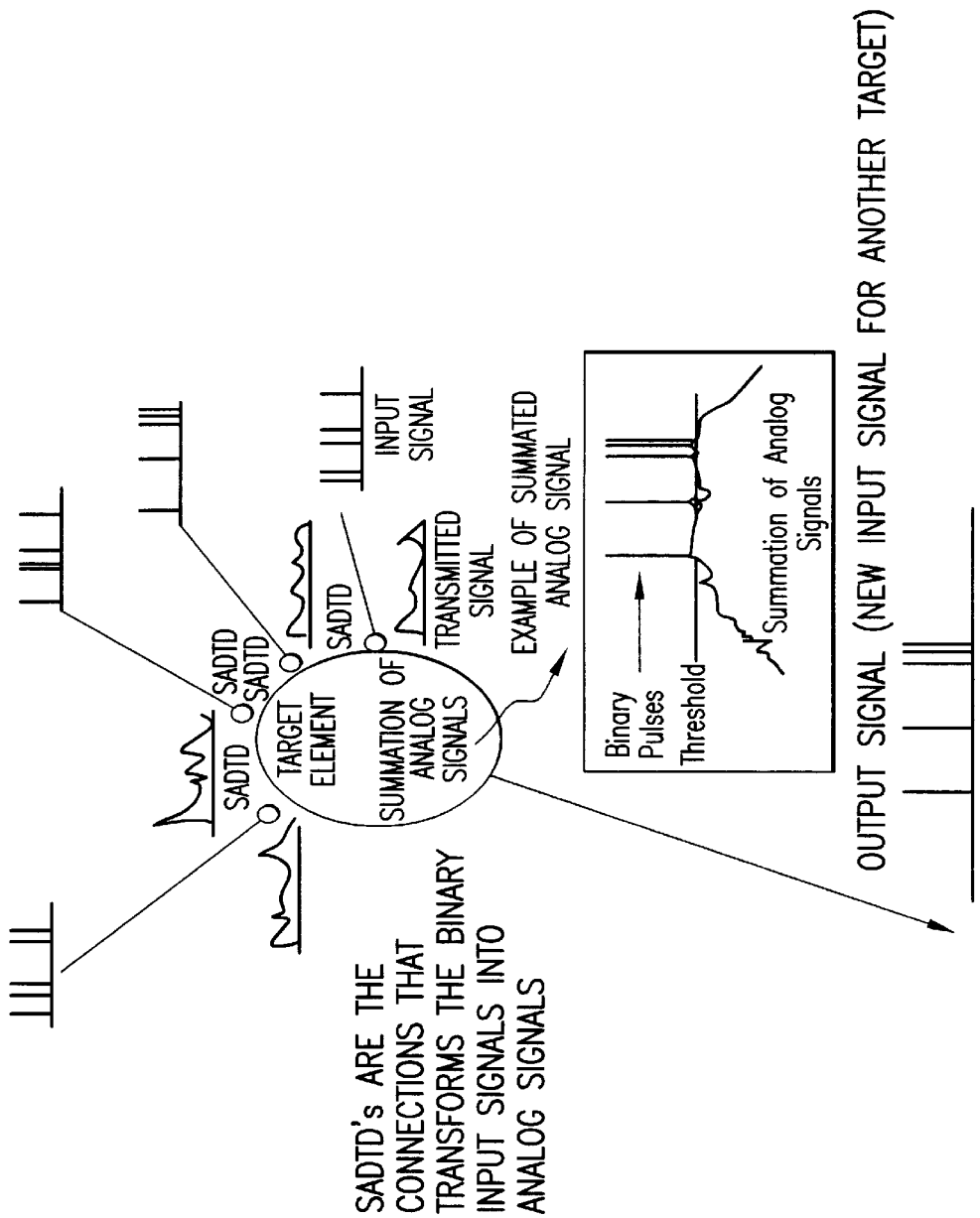
FIG. 3 illustrates schematically the summation of analog signals received at a target element, and the production of binary pulses based thereon.

FIG. 3 shows the connection of a single target (neuronal) element, which receives input analog signals from a large number of saSTD's (four being shown for simplicity), and sums the input signals to generate a series of output pulses which are provided to other target elements. Prior art provided complex functions to perform this summation, but this invention is not related to the way in which these processing elements integrate the information.

According to the invention, when cells in a network are interlinked with such connections (FIG. 4) and allowed to adapt according to MapSA, the parameters also adapt according to the local computation at each connection (using $S_i$ and $S_o$). The arrangement, however, is constructed such that information about the network activity is embedded within the MapSA. The logic here is that the value of even a single parameter in a single saSTD on a single neuron should be changed according to its contribution in the context of the entire network's activity and thereby become aligned with the transmission mode of all other saSTDs. Thus, a novel situation is achieved with saSTDs: a single parameter on a single connection is adaptable according to how well it performed in the context of the activity in the whole network (millions or even billions of saSTDs).

Even though global information could be inserted into single saSTDs using the MapSA, the MapSA could itself be subject to higher level control. For example, the MapSA could be guided by global factors where a network performance index (any defined activity state of the network) can selectively permit or gate the generation of the regulatory factors Rff, Rfa, Rfd and Rfa.

The self-organization process and apparatus according to the invention are novel from several perspectives:

1. Multiple parameters of the same connection are regulated.
2. Parameters that regulate the dynamics of transmission are specifically and individually regulated.
3. Parameters are not changed simply according to a coincidence or correlation principles as in prior art algorithms, but a selection criteria is first established to assess the importance of the parameter in the ongoing activity.
4. A novel cross-over positive feed forward gating mechanism is incorporated to compare the importance of the value of a single parameter within a single connection with the total activity of the target cell.
5. The factors that regulate the transmission also regulate the adaptation process.
6. The regulation of each connection parameter is determined by the values of all the other parameters. This creates a novel link between each parameter within a single connection and across all connections in the entire network.
7. The strength of the connection is changed according to a plasticity index which embodies the rate of change of the connection which, in turn, reflects how appropriately the connection is being used.
8. The strength of a single connection is changed by comparing the plasticity indices of the connection with that of the mean plasticity index for all connections received. It is novel to change strength in terms of the extent to which the kinetic parameters are changed.
9. Global gating of selected multiple parameters of a single connection.

The invention provides a mechanistic algorithm by which coordinated changes can be made in several synaptic parameters at a single connection, and therefore provides a basis for controlling smart connections, which could boost the computational power of networks of interacting elements, and enhance the capacity for adaptation.

Figure 4:
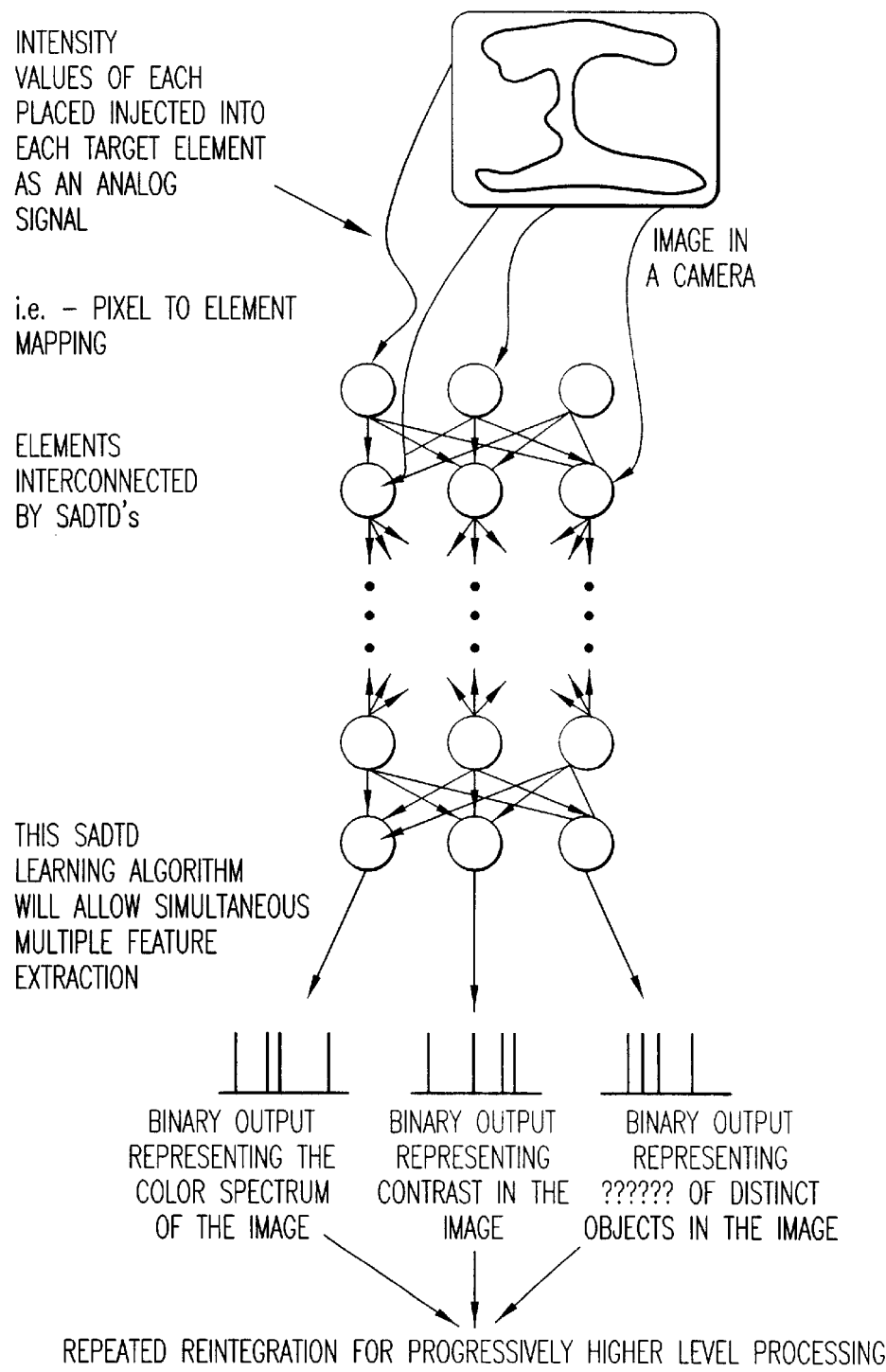
FIG. 4 is a schematic depiction of a neural network comprising a plurality of information processing connections which are regulated by the MapSA process according to the invention.

Such connections behave in a complex manner (hence the term "smart connections") determined by the parameters. This results in a highly sophisticated mechanism for selection of the information which is transmitted to the target (analogous to a "smart filter"). The adaptation process according to the invention therefore allows very subtle and complex changes in the content of information transmitted. NOTE: in prior art, the synapse was not considered to play an active role in determining the information content, instead it was regarded as a passive transmitter that changes only in the strength of transmission. These connections can be used to link a network of elements, including not only cells, but also neuron-like structures as illustrated in FIG. 4. By using these "smart connections", information can be broken into a virtually infinite number of different representations.

The MapSA process provided according to the invention can control the landscape of such representations, and hence can be fundamental to information processing and storing of specific representations or memories within networks of cells. More specifically, when a network of several thousand cells are connected with STDs, it is useless to set the values of the kinetic parameters arbitrarily or by hand, since each parameter needs to be dependent on each other parameter in each connection in the entire network. In order to construct such interdependencies it is essential to execute an algorithm that changes each synaptic parameters as a function of the value of each other parameter in the context of activity patterns which are taking place. The invention thus establishes interrelationships between connection parameters in the context of all activity in the network and hence all connection parameters at all connections in the network. In keeping with the spirit of the invention, it is therefore possible to construct analogous control mechanisms and different algorithms that will achieve the same goal.

Connecting interacting elements into a network has the advantage of massive parallel information processing. "Neural networks" of the generic type such as shown in FIG. 4 have been used extensively in a wide range of software applications such as in speech/voice recognition, pattern/feature detection, motion detection, fault detector, stock market analysis, weather forecasting, image processing and analysis, etc. In a network with STDs the strength of the connection between cells is effectively changing ("dynamically") all the time, which is fundamentally equivalent to having a different network at every moment of operation, or a computer which changes its hardware every few thousandths of a second. The applicant is not claiming to have invented smart connections, but has invented a process and apparatus to allow smart connections to self-organize and hence be implemented into networks in a meaningful way. Implementing the MapSA with the aim of establishing a relationship between STDs and hence to align their transmission and their function, makes possible networks with STDs. Such networks could perform complex tasks with much greater efficiency, speed capacity and flexibility and could exhibit virtually infinite adaptability.

The potential information processing capacity and flexibility of a network with saSTDs is simply too large to define. One key aspect of such networks could be their ability to allow self-regulation of the network's ability to adapt, which can serve as the basis for creative networks.

As shown in the description earlier, it is also possible to construct smart connections and the MapSA to control them as small electronic circuits—i.e., "smart self-adapting silicon synapses". As illustrated in FIG. 4, these hardwired tunable smart connections could be imbedded in silicon or other systems to form links between elements within a network, thus allowing the analog hardware construction of smart networks which are useful in the field of robotics and computers. These tunable smart connections can also provide fundamental elements within electronic circuit boards allowing dynamic circuit boards that would change their properties depending on the operational circumstances. For example, a robot placed on Mars may need to be able to adapt to different conditions so as to process the same information regardless of dramatic changes in the environmental conditions. Such networks permit the creation of "multiple personalities" for electronic circuit boards, computers, robots and robotics parts—a flexibility that dramatically enhances the efficiency of such systems.

The foregoing disclosure has been set forth merely to illustrate the potential applications of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self adapting smart transmission device comprising:
   an information transmission element having an information transmission function which is dynamically variable in response to a plurality of transmission parameters; and
   a transmission parameter evaluation element having a multiparameter evaluation function for evaluating the transmission contribution of each parameter as a function of transmission contributions of other parameters; and
   a transmission parameter modification element having a multiparameter modification function which is dynamically variable in response to a plurality of transmission parameters for modifying the transmission contribution of each parameter as a function of transmission contributions of other parameters.

2. A self adapting smart transmission device according to claim 1 further comprising a cross-over positive feed forward gating element as a mechanism to determine a causal relationship between an influence of a particular parameter on transmission of a signal and an effect of said signal on a component which receives an output of said smart transmission device.

3. A method of storing information in a storage medium having a plurality of switching elements with at least two switching states, comprising:
   switching said switching elements in accordance with information to be'stored; and
   varying one, switching states, as a function of the states of all switches.

4. A method of storing information in a storage medium according to claim 3 wherein variation of the switching states is performed adaptively or interactively.

5. A self adapting smart transmission device comprising:
   an information transmission element having an information transmission function which is dynamically variable in response to a plurality control parameters; and
   means for establishing interrelationships among said control parameters as a function of frequency of an input signal to said information transmission element.

6. A self adapting smart transmission device according to claim 5 further including means for varying each of said parameters as a function of its importance in influencing transmission of an input signal to said device.

7. A self adapting smart transmission device according to claim 6 further comprising a cross-over positive feed forward gating component to determine a causal relationship between influence of a particular parameter on transmission of a signal and an effect of said signal on a component which receives an output of said smart transmission device.

8. A process for transmitting information via an information transmission element, comprising:
   varying a transfer function of the transmission element in response to a plurality of control parameters;
   varying said plurality of control parameters according to a learning algorithm; and
   regulating the learning algorithm in response to values of the control parameters.

9. A process for transmitting information according to claim 8 wherein variation of a particular control parameter is determined by values of other control parameters.

10. A process for transmitting information according to claim 8 wherein a maximum transmission strength of the transmission element is varied in response to a plasticity index which is based on a frequency of updating of the transfer function.

11. A process for transmitting information according to claim 10 wherein the maximum transmission strength of a particular transmission element is determined in response to a comparison of the plasticity index for the particular transmission element with a mean plasticity index for transmission elements having commonly connected outputs.

12. A process for transmitting information via an information transmission element according to claim 8 wherein only a selected subset of at least one feature of transmitted information is modulated by the transmitting process.

13. A method of storing information in a storage medium having a plurality of switching elements with at least two switching states, comprising:

switching said switching elements in accordance with information to be stored; and varying said switching states according to prior history of switching states of said switching elements.

14. A method of storing information in a storage medium according to claim 13 wherein variation of the switching states is performed adaptively or interactively.

15. A method of operating a network of interconnected information transmitting elements for receiving and transmitting a succession of information signals, said method comprising:

providing each of said elements with an information transmission function which is dynamically variable within a period of successive information signals received thereby, as a function of a plurality of information transmission parameters;

controlling time variation of a value of each of said plurality of information transmission parameters for a particular element as a function of values of other transmission parameters for said particular element, and as a function of an output response of the particular element and an output response of other elements contained in the network.

16. The method according to claim 15, wherein said information signals comprise pulses.

17. A method of operating a network of interconnected information transmitting elements for receiving and transmitting a succession of information signals, said method comprising:

providing each of said elements with an information transmission function which is dynamically variable within a period of successive information signals received thereby, as a function of a plurality of information transmission parameters;

controlling time variation of a value of each of said plurality of information transmission parameters for a particular element as a function of values of other transmission parameters for said particular element, and as a function of a signal characteristic of information signals received by said element.

18. A method of operating a network of interconnected information transmitting elements according to claim 17 wherein said information signals comprise pulses.

19. A method of operating a network of interconnected information transmitting elements according to claim 17 wherein said signal characteristic is frequency.

20. A method of operating a network of interconnected information transmitting elements according to claim 19 wherein said step of controlling further includes controlling said time variation of said plurality of information transmission parameters as a function of an output response of the particular element and an output response of other elements contained in the network.

21. An information processing network comprising:

a plurality of interconnected information processing nodes, each such node receiving a succession of information signals, and transmitting corresponding information signals to other information processing nodes according to a transfer function which is dependent upon a plurality of dynamically variable transmission parameters; and means for varying values of said transmission parameters for a particular information processing node within a period of successive information signals input thereto, as a function of values of other transmission parameters for said particular information processing node, and as a function of an output response of said particular information processing node and of an output response of other information processing nodes contained in said network.

22. The information processing network according to claim 21 wherein said information signals comprise pulses.

23. An information processing network comprising:

a plurality of interconnected information processing nodes, each such node receiving a succession of information signals, and transmitting corresponding information signals to other information processing nodes according to a transfer function which is dependent upon a plurality of dynamically variable transmission parameters; and means for varying values of said transmission parameters for a particular information processing node within a period of successive information signals input thereto, as a function of a signal characteristic of an input signal to said particular information processing node.

24. The information processing network according to claim 23, wherein said information signals comprise pulses.

25. An information processing network according to claim 23 wherein said signal characteristic is frequency.

26. An information processing network according to claim 25 wherein said means for varying includes varying said transmission parameters as a function of values of other transmission parameters for said particular information processing node, and as a function of an output response of said particular information processing node and of an output response of other information processing nodes contained in said network.

27. An information processing network comprising a plurality of interconnected dynamically variable transmission circuits which transfer information input thereto, according to a transfer function which is dependent on a plurality of transmission parameters, wherein each of said parameters for each particular transmission circuit is adjusted in a time variable manner, as a function of values of other parameters for said particular transmission circuit, and as a function of an output response of said particular transmission circuit and of an output response of other transmission circuits in said network.

28. An information processing network comprising a plurality of interconnected dynamically variable transmission circuits which transfer information input thereto, according to a transfer function which is dependent on a plurality of transmission parameters, wherein each of said parameters for each particular transmission circuit is adjusted in a time variable manner, as a function of values of other parameters for said particular transmission circuit, and as a function of a signal characteristic of an input signal to said particular transmission circuit.

29. An information processing network according to claim 28, wherein said signal characteristic is frequency.

30. An information processing network according to claim 29 wherein adjustment of said parameters for each particular transmission circuit includes adjustment as a function of values of other parameters for said particular transmission circuit, and as a function of an output response of said particular transmission circuit and of an output response of other transmission circuits in said network.

31. A method of processing information, comprising:

inputting a succession of time variable input information signals into an information processing network comprised of a plurality of interconnected information processing nodes, each of which processes information input thereto according to an information processing function which is dynamically variable within a period of a single input signal, as a function of a plurality of processing parameters; and controlling time variation of values of each of said plurality of processing parameters for a particular information processing node as a function of values of other processing parameters for said particular information processing node, and as a function of an output response of said particular information processing node and of other information processing nodes in said network.

32. A method of processing information, comprising:

inputting a succession of time variable input information signals into an information processing network comprised of a plurality of interconnected information processing nodes, each of which processes information input thereto according to an information processing function which is dynamically variable within a period of a single input signal, as a function of a plurality of processing parameters; and controlling time variation of values of each of said plurality of processing parameters for a particular information processing node as a function of a signal characteristic of an input signal to said particular information processing node.

33. A method of processing information according to claim 32 wherein said signal characteristic is frequency.

34. A method of processing information according to claim 33 wherein said step of controlling includes controlling time variation of each of said parameters for said particular information processing node as a function of values of other processing parameters for said particular information processing node, and as a function of an output response of said particular information processing node and of other information processing nodes in said network.

* * * * *